United States Patent Office 2,944,934
Patented July 12, 1960

2,944,934

INSECT REPELLENT METHOD AND COMPOSITION

Lyle D. Goodhue and James N. Short, Bartlesville, Okla., assignors to Phillips Petroleum Company, a corporation of Delaware No Drawing. Filed Feb. 15, 1957, Ser. No. 640,337

34 Claims. (Cl. 167—30)

This invention relates to insect repellents and to a method for repelling insects. The repellents of the invention are especially suitable for repelling stable flies but are effective to repell other insect pests, e.g., hornflies, mosquitoes, cockroaches and the like.

The repellents of the invention are certain esters of aryl-substituted alkanediols and certain esters of arylsubstituted alkenols. 3-phenyl-1-acetoxy-3-butanol, 1-acetoxy-3-phenyl-2-butene, and 3-phenyl-1-acetoxy-3-butene are specific examples, respectively, of said classes of compounds. 1-acetoxy-3-phenyl-2-butene is particularly effective against stable flies.

The repellent compounds of the invention can be represented by the formulas

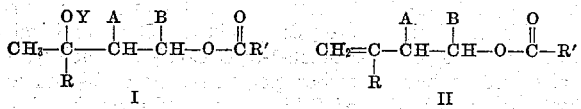

and

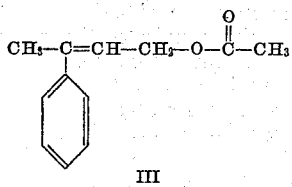

III wherein Y is a member of the group consisting of —H and $$-\overset{\text{O}}{\underset{\|}{\text{C}}}-\text{R}'$$

wherein R represents an aryl radical containing not over 14 carbon atoms, such as a phenyl or naphthyl radical which can contain substituents which can be any hydroxy, alkoxy, nitro and alkyl group, but with the total number of carbon atoms in the substituent radicals generally not greater than 8, wherein R' is an alkyl radical containing from 1 to 6 carbon atoms, and A and B are selected from the group consisting of H, methyl and ethyl.

This application is a continuation-in-part of Serial No. 436,706, filed June 14, 1954, by the present inventors, and now abandoned.

In addition to the compounds already named herein, compounds coming within the above identification include 4-enanthoxy-2-(4-t-butylphenyl) - 2 - butanol, 2-(1-naphthyl)-4-valeroxy-1-butene, 2-(2-[4 - ethylnaphthyl])-4-propionoxy-3-methyl-2-butanol, 4-acetoxy - 3 - methyl-2-phenyl-2-butanol, 4-acetoxy-2-phenyl - 2 - hexanol, 2,4-diacetoxy-2-phenylhexane, 2,4 - dienanthoxy - 2 - (4-n-octylphenyl)- butane, 2,4-diacetoxy - 2 - (2 - hydroxy-4-nitrophenyl)butane, 4 - acetoxy - 2 - (4-ethoxyphenyl)-2-butanol, 2-phenyl-3-ethyl - 4 - enanthoxy - 1 - pentene, 2-phenyl-4-propionoxy-1 - hexene, 2 - (4 - n-octylphenyl)-4-acetoxy-1-butene, and 2-(2 - hydroxy - 4 - nitrophenyl)4-caproxy-1-butene.

One method of preparing some of these compounds is that described by Price et al. in J. Am. Chem. Soc. 71, 2860-2 (1949), in which α-methylstyrene is reacted with formaldehyde in glacial acetic acid containing a small amount of sulfuric acid. By this reaction are produced 3-phenyl-1-acetoxy - 3 - butene, 3 - phenyl-1 - acetoxy-3-butanol, and, by the hydrolysis of these compounds with aqueous sodium hydroxide, 3-phenyl-3-buten-1-ol and 3-phenyl-1,3-butanediol. Other esters of 3-phenyl-3-buten-1-ol can be obtained by esterifying.

Of these compounds, those which are included in the structural formulas given above are all effective in repelling stable flies from surfaces frequented by them. The stable fly Stomoxys calcitrans (Linn.) is a bad pest of domestic animals, particularly of cattle and horses. The stable flies have long piercing mouth parts which they use to penetrate the skin of the animal and feed on the animal. They worry the animals continuously, and weaken them by sucking their blood. This results in a great economic loss. In the case of dairy cows, milk production diminishes markedly when the cows are bothered by large numbers of stable flies. The compounds of our invention can be applied to either the surface of the animal and/or of nearby objects, such as the walls and stalls of barns. They serve to eliminate entirely or to reduce the number of flies settling on such surfaces for a considerable period of time.

The compounds can be applied to such surfaces in any suitable form, such as emulsions, solutions, aerosols, fogs, and the like, and in any suitable manner, as by spraying, brushing, and the like. An adjuvant substance to sufficiently dilute the repellent ingredient is required for best results.

Generally, it is advantageous to make application of the repellent in a way which will deposit from about 0.05 to 5 grams of the active ingredient per square foot of surface. However, larger or smaller amounts can be applied, if desired. Less absorbent surfaces may require smaller amounts than more absorbent surfaces.

The compounds can be used in admixture with each other, or with other insect repellents. One such mixture is described in copending Serial No. 419,110. They can also be used in admixture with insecticides, thereby realizing the benefits of all the active ingredients. For example, a fly spray containing 0.1 percent by weight of the pyrethrins, 1.0 percent of piperonyl butoxide, 0.5 percent of methoxychlor or similar small amount of other insecticide in a base of deodorized kerosene is usually sprayed on dairy cattle before each milking. This frquent spraying is necessary because the residual spray loses its effectiveness before the next milking period. The addition of 0.5 to 5 percent by weight of one of the repellents of this invention effective against stable flies to the above defined spray gradually lengthens the necessary time interval between applications as the residual spray on the cows increases in amount until the time interval is three days or longer. Addition of larger, or smaller, proportions of the repellent ingredient of the invention is within the scope of the claims. However, there is a limit to the concentration. On the low side there must be sufficient of the ingredient to render the area repellent and on the high side the repellent must not cause discomfort to the animal being protected. Hence, dilution before application is essential. If applied without dilution with a solvent or an emulsion base, then the method of application must have a diluting effect.

EXAMPLE I

Organdy bags having 100 square inches of area were impregnated with the desired amount of chemical dissolved in 6 to 7 ml. of acetone and were then suspended on a line to dry. After 24 hours, the bags were drawn over the hand and exposed to several thousand hungry stable flies Stomoxy calcitrans (Linn.) confined in 30 inch cubical cages. The flies were those reared according to the method of Campau et al. described in a paper presented before the American Association of Economic Entomologists, Cincinnati, December 12–15, 1951. The time to the first bite was recorded. If no bites were received in five minutes, one of two procedures was followed. (1) The bag was withdrawn and shortly thereafter reinserted into the cage for a second five minute period. This was repeated until the bag had been inserted for a total of three successive five minute periods. On following days, three additional successive tests were made. Generally the flies bite in less than a minute if they bite at all. (2) The bags were inserted in the cages for one five minute period only, and tested once only on successive days. In both procedures, the bags are suspended open to aeration between trials on successive days. In the table below are given the results using various chemicals.

*Table I*

REPELLENCY OF CHEMICALS TO STABLE FLIES

| Name of Chemical | Gms. of Chemical per 100 sq. in. Fabric | Successive Trial Number | Seconds to First Bite—Bags Aged | | | |
|---|---|---|---|---|---|---|
| | | | 1 Day | 2 Days | 3 Days | 4 Days |
| 1-acetoxy-3-phenyl-2-butene | 0.5 | 1 | [2]NB | 25 | | |
| | | 2 | NB | 15 | | |
| | | 3 | NB | 20 | | |
| 1-acetoxy-3-phenyl-2-butene | 1.0 | 1 | NB | NB | NB | 38 |
| | | 2 | NB | NB | NB | 28 |
| | | 3 | NB | NB | NB | 11 |
| 3-phenyl-1-acetoxy-3-butanol | 0.5 | [1]1 | NB | | | |
| 3-phenyl-1-acetoxy-3-butene | 0.5 | [1]1 | NB | | | |
| 3-phenyl-1-acetoxy-3-butene | 1.0 | 1 | NB | 205 | | |
| | | 2 | NB | 34 | | |
| | | 3 | NB | 22 | | |

[1] These tests were made with dried but unaged impregnated organdy bags.
[2] NB=no bites in 5 minutes.

Solvents or carriers which can be employed for the repellents of this invention include hydrocarbons such as kerosene, naphthas, the isoparaffinic fractions sold under the trademark Soltrol which are advantageously prepared by the alkylation of an isoparaffin with an olefin in the presence of hydrofluoric acid and which boil in the range 260°–800° F.; and organic solvents such as acetone and the like. The repellents can also be applied in an aqueous emulsion, or they can be admixed with talc or similar material and applied as a dust. Any solvent ordinarily useful for distributing insect repellents and having no deleterious effect on these specific repellents can be employed.

The 1-acetoxy-3-phenyl-2-butene used in the tests just described was prepared by treating 1062 grams of α-methylstyrene with 330 grams of paraformaldehyde in 3 liters of glacial acetic acid. After refluxing for three hours, 1½ liters of acetic acid was removed by distillation, the residue was poured into 4 liters of water. The organic layer was recovered, washed with water, washed with dilute potassium carbonate, and dried over anhydrous potassium carbonate. The bulk of the batch was distilled at 0.3 to 1.0 mm. and then fractionated to yield 1-acetoxy-3-phenyl-2-butene boiling at 112–116° C. at 1.5–2.0 mm. of mercury pressure, and had a refractive index of ($n_D^{20}$) of 1.5314.

EXAMPLE II

A sample of 1-acetoxy-3-phenyl-2-butene was prepared and identified as follows. Ten moles (1180 grams) of alpha-methylstyrene, 11.0 moles (330 grams) of paraformaldehyde, 39.4 moles (2360 grams) of glacial acetic acid, and 3.6 ml. of concentrated sulfuric acid were fed to a reactor and reacted for 3 hours by stirring at 35° C. During this period, the temperature rose to 45° C., but was lowered to 35°–40° C. and kept in this range for the duration of the run. After the reaction appeared complete, the reaction mixture was poured into one liter of water and extracted with two liters of benzene. This benzene layer was then washed with one liter of water, one liter of 6 N sodium carbonate solution, and one liter of water again. Water and benzene were then distilled through a stripping assembly until the pot temperature reached 200° C. Distillation cuts were then taken from the pot residue, and the material boiling at 125° C. at 5 mm. of mercury absolute pressure was collected.

Two fractions were collected which boiled at 125° C. at 5 mm. One fraction, amounting to 24.5 grams, had a refractive index of 1.5320, while the other fraction, amounting to 12.5 grams, had a refractive index of 1.5330. The combined samples gave positive results when tested for unsaturation.

This material also gave positive results when tested by the hydroxamate ester test, and its molecular weight as determined by its bromine number was found to be 182. Hydrolysis of a portion of this material gave acetic acid as one product, proved by forming the S-benzyl-thiouronium salt of acetic acid. The prepared salt had a melting point of 132°–134° C. as compared to the value given in the literature of 132° C.

Infrared and ultraviolet spectrum analyses were run on both the unhydrolyzed material and on the non-acid product of hydrolysis. The spectrum of the unhydrolyzed material indicated that it was a phenylacetoxybutene, while the spectrum data on the non-acid hydrolysis product was found to be consistent with the structure of 3-phenyl-2-buten-1-ol. An elemental analysis was then run on this non-acid hydrolysis product. The empirical formula for 3-phenyl-2-buten-1-ol is $C_{10}H_{12}O$ which was calculated to have a carbon percentage of 81.04 and a hydrogen percentage of 8.16. The results of the elemental analysis indicated a carbon percentage of 81.4 and a hydrogen percentage of 8.38.

All of these analyses indicated that the compound, as originally prepared, was 1-acetoxy-3-phenyl-2-butene, so an elemental analysis was run to check this conclusion. The calculated percentages of carbon and hydrogen for $C_{12}H_{14}O_2$ were carbon—75.79 and hydrogen—7.39. The analytical results gave carbon—75.67 and hydrogen—7.13. A further check was made by the saponification equivalent which was found to be 198, a close check for the calculated value of 190. The calculated molecular weight for this compound is 190.

The above prepared compound was tested for repellency to stable flies by the same method described in Example I. The results of these tests are expressed below as Table II.

*Table II*

| Name of Chemical | Grams of Chemical per 100 sq. inches Fabric | Successive Trial Number | Seconds to First Bite—Bags Aged | | |
|---|---|---|---|---|---|
| | | | 1 Day | 2 Days | 3 Days |
| 1-acetoxy-3-phenyl-2-butene | 1.0 | 1 | [1]NB | NB | 67 |
| | | 2 | NB | NB | 22 |
| | | 3 | NB | NB | 194 |

[1] NB—no bites in 5 minutes.

The several classes of compounds here claimed are not necessarily to be considered to be chemical equivalents but rather alternatives as repellent composition ingredients. However, it is convenient and possible to group them together. Such grouping is not, however, intended to mean that the classes of compounds are equivalents in the sense that if one class is found to be repellent, it follows that any of the other classes can be stated to be repellent. Only actual testing of one of the compounds of each type, as here disclosed, can assure one of their respective repellencies, if any.

When 3-phenyl-3-buten-1-ol was tested for repellency to stable flies by the method described in Example I, only 17 seconds elapsed on the first day before the first bite occurred, indicating no repellency.

Reasonable variation and modification are possible within the scope of the foregoing disclosure and the appended claims to the invention, the essence of which is that certain classes of compounds have been discovered to be insect pest repellents and that the said classes are esters of aryl-substituted alkanediols, for example, butanediols, and esters of aryl-substituted alkenols, for example, butenols.

We claim:

1. A composition useful for repelling insects which comprises a compound selected from the group consisting of compounds which have a characteristic structure as follows:

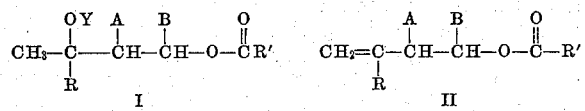

and

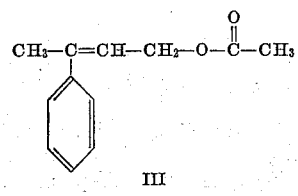

wherein Y is a member of the group consisting of —H and $$-\overset{\text{O}}{\underset{\|}{\text{C}}}-\text{R}'$$

wherein R is selected from the group consisting of an aryl radical containing not over 14 carbon atoms and such a radical which has been substituted with a radical selected from the group consisting of hydroxy, alkoxy, nitro and alkyl, the total number of carbon atoms in any substituent radical being not greater than 8; wherein R' is an alkyl radical containing from 1–6 carbon atoms; and A and B are selected from the group consisting of H, methyl and ethyl, and sufficient of a repellent adjuvant to apply the same.

2. A composition useful for repelling insects which comprises 1-acetoxy-3-phenyl-2-butene in a quantity sufficient upon application to repel insects in an adjuvant substance present in quantity sufficient to dilute said butene to permit it to act in desirable manner as a repellent for insects.

3. A composition useful for repelling insects which comprises 0.5–5 percent by weight of 1-acetoxy-3-phenyl-2-butene in a repellent adjuvant.

4. A repellent composition according to claim 3 wherein said adjuvant is selected from the group consisting of kerosene, acetone, naphtha, isoparaffinic hydrocarbon fractions, aqueous emulsion, and talc.

5. A composition for repelling insects which comprises 3-phenyl-1-acetoxy-3-butanol in a quantity sufficient upon application to repel insects in an adjuvant substance present in quantity sufficient to dilute said butanol to permit it to act in desirable manner as a repellent for insects.

6. A composition for repelling insects which comprises 0.5–5 percent by weight of 3-phenyl-1-acetoxy-3-butanol in a repellent adjuvant.

7. A repellent composition according to claim 6 wherein said adjuvant is selected from the group consisting of kerosene, acetone, naphtha, isoparaffinic hydrocarbon fractions, aqueous emulsion, and talc.

8. A composition for repelling insects which comprises 3-phenyl-1-acetoxy-3-butene in a quantity sufficient upon application to repel insects in an adjuvant substance present in quantity sufficient to dilute said butene to permit it to act in a desirable manner as a repellent for insects.

9. A composition for repelling insects which comprises 0.5–5 percent by weight of 3-phenyl-1-acetoxy-3-butene in a repellent adjuvant.

10. A repellent composition according to claim 9 wherein said adjuvant is selected from the group consisting of kerosene, acetone, naphtha, isoparaffinic hydrocarbon fractions, aqueous emulsion, and talc.

11. A composition suitable for repelling insects which comprises in an insect repellent adjuvant in an amount sufficient to dilute the same to a concentration proper for effective application and use of 1-acetoxy-3-phenyl-2-butene.

12. A composition suitable for repelling insects which comprises in an insect repellent adjuvant in an amount sufficient to dilute the same to a concentration proper for effective application and use of 3-phenyl-1-acetoxy-3-butanol.

13. A composition suitable for repelling insects which comprises in an insect repellent adjuvant in an amount sufficient to dilute the same to a concentration proper for effective application and use of 3-phenyl-1-acetoxy-3-butene.

14. A composition suitable for repelling insects which comprises in an insect repellent adjuvant in an amount sufficient to dilute the same to a concentration proper for effective application and use of 4-enanthoxy-2-(4-t-butylphenyl)-2-butanol.

15. A composition suitable for repelling insects which comprises in an insect repellent adjuvant in an amount sufficient to dilute the same to a concentration proper for effective application and use of 2-(1-naphthyl)-4-valeroxy-1-butene.

16. A composition suitable for repelling insects which comprises in an insect repellent adjuvant in an amount sufficient to dilute the same to a concentration proper for effective application and use of 2-(2-[4-ethylnaphthyl])-4-propionoxy-3-methyl-2-butanol.

17. A composition suitable for repelling insects which comprises in an insect repellent adjuvant in an amount sufficient to dilute the same to a concentration proper for effective application and use of 4-acetoxy-3-methyl-2-phenyl-2-butanol.

18. A composition suitable for repelling insects which comprises in an insect repellent adjuvant in an amount sufficient to dilute the same to a concentration proper for effective application and use of 4-acetoxy-2-phenyl-2-hexanol.

19. A composition suitable for repelling insects which comprises in an insect repellent adjuvant in an amount sufficient to dilute the same to a concentration proper for effective application and use of 2,4-diacetoxy-2-phenylhexane.

20. A composition suitable for repelling insects which comprises in an insect repellent adjuvant in an amount sufficient to dilute the same to a concentration proper for effective application and use of 2,4-dienanthoxy-2-(4-n-octylphenyl)butane.

21. A composition suitable for repelling insects which comprises in an insect repellent adjuvant in an amount sufficient to dilute the same to a concentration proper for effective application and use of 2,4-diacetoxy-2-(2-hydroxy-4-nitrophenyl)butane.

22. A composition suitable for repelling insects which comprises in an insect repellent adjuvant in an amount sufficient to dilute the same to a concentration proper for effective application and use of 4-acetoxy-2-(4-ethoxyphenyl)-2-butanol.

23. A composition suitable for repelling insects which comprises in an insect repellent adjuvant in an amount sufficient to dilute the same to a concentration proper for effective application and use of 2-phenyl-3-ethyl-4-enanthoxy-1-pentene.

24. A composition suitable for repelling insects which comprises in an insect repellent adjuvant in an amount sufficient to dilute the same to a concentration proper for effective application and use of 2-phenyl-4-propionoxy-1-hexene.

25. A composition suitable for repelling insects which comprises in an insect repellent adjuvant in an amount sufficient to dilute the same to a concentration proper for effective application and use of 2-(4-n-octylphenyl)-4-acetoxy-1-butene.

26. A composition suitable for repelling insects which comprises in an insect repellent adjuvant in an amount sufficient to dilute the same to a concentration proper for effective application and use of 2-(2-hydroxy-4-nitrophenyl)-4-caproxy-1-butene.

27. A fabric repellent to insects comprising 0.5–5 grams per square foot of a repellent ingredient selected from the group consisting of compounds which have a characteristic structure as follows:

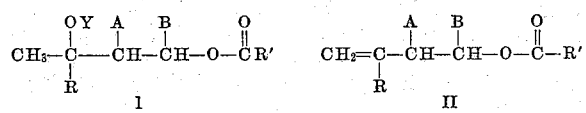

and

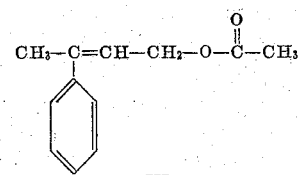

wherein Y is a member of the group consisting of —H and

wherein R is selected from the group consisting of an aryl radical containing not over 14 carbon atoms and such a radical which has been substituted with a radical selected from the group consisting of hydroxy, alkoxy, nitro and alkyl, the total number of carbon atoms in any substituent radical being not greater than 8; wherein R' is an alkyl radical containing from 1–6 carbon atoms; and A and B are selected from the group consisting of H, methyl and ethyl.

28. A method for repelling insects which comprises applying at the place from which the insect is to be repelled a repelling quantity of a compound selected from the group consisting of compounds which have a characteristic structure as follows:

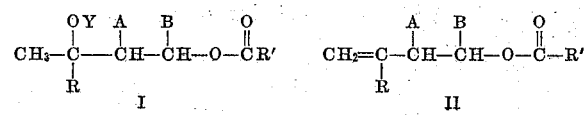

and

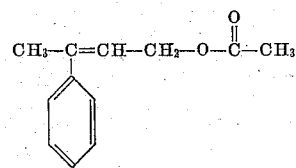

wherein Y is a member of the group consisting of —H and

wherein R is selected from the group consisting of an aryl radical containing not over 14 carbon atoms and such a radical which has been substituted with a radical selected from the group consisting of hydroxy, alkoxy, nitro and alkyl, the total number of carbon atoms in any substituent radical being not greater than 8; wherein R' is an alkyl radical containing from 1–6 carbon atoms; and A and B are selected from the group consisting of H, methyl and ethyl.

29. A method of repelling an insect which comprises applying at the place from which the insect is to be repelled, a repelling quantity of 1-acetoxy-3-phenyl-2-butene.

30. A method of repelling an insect which comprises applying at the place from which the insect is to be repelled, a repelling quantity of 3 - phenyl - 1 - acetoxy-3-butanol.

31. A method of repelling an insect which comprises applying at the place from which the insect is to be repelled, a repelling quantity of 3-phenyl-1-acetoxy-3-butene.

32. A method of repelling an insect which comprises applying 0.05–5 grams of 1-acetoxy-3-phenyl-2-butene per square foot of surface at the place from which the insect is to be repelled.

33. A method of repelling an insect which comprises applying 0.05–5 grams of 3-phenyl-1-acetoxy-3-butanol per square foot of surface at the place from which the insect is to be repelled.

34. A method of repelling an insect which comprises applying 0.05–5 grams of 3-phenyl-1-acetoxy-3-butene per square foot of surface at the place from which the insect is to be repelled.

References Cited in the file of this patent
UNITED STATES PATENTS 2,563,832    Gates _____ Aug. 14, 1951

OTHER REFERENCES

Drake, 642 O.G. 686 (70,390), Jan. 9, 1951.
Drake, 642 O.G. 686 (70,392), Jan. 9, 1951.